United States Patent [19]
Hibino et al.

[11] Patent Number: 5,313,131
[45] Date of Patent: May 17, 1994

[54] SLOTLESS MOTOR

[75] Inventors: Sadayoshi Hibino, Mie; Motoyasu Mochizuki; Yoshinobu Nakamura, both of Aichi, Japan

[73] Assignee: Kabushiki Kaisha Toshiba, Kawasaki, Japan

[21] Appl. No.: 962,662

[22] Filed: Oct. 19, 1992

[30] Foreign Application Priority Data

Oct. 22, 1991 [JP] Japan .................................. 3-273851

[51] Int. Cl.$^5$ .............................................. H02K 1/12
[52] U.S. Cl. ...................................... 310/254; 310/179
[58] Field of Search ............... 310/254, 256, 258, 261, 310/156, 179, 184

[56] References Cited

U.S. PATENT DOCUMENTS

| | | | |
|---|---|---|---|
| 4,607,803 | 8/1986 | Nozawa | 29/598 |
| 4,644,209 | 2/1987 | Nozawa | 310/198 |
| 4,703,211 | 10/1987 | Yazaki et al. | 310/254 |
| 4,954,739 | 9/1990 | Schultz et al. | 310/156 |

FOREIGN PATENT DOCUMENTS

| | | | |
|---|---|---|---|
| 1-252134 | 10/1989 | Japan | 310/254 |
| 1-252135 | 10/1989 | Japan | 310/254 |

Primary Examiner—Steven L. Stephan
Assistant Examiner—Matthew Nguyen
Attorney, Agent, or Firm—Foley & Lardner

[57] ABSTRACT

A slotless motor has a sufficiently small gap between a stator and a rotor, and improves characteristics of the torque and the power factor. Accordingly, the slotless motor comprises stator cores having no slots, coils forming revolving magnetic fields in the stator cores, and rotors having a permanent magnet. The coils are disposed along the stator cores cylindrically and constructed in one layer. Each of the coils forms a part which decreases the distribution of the number of turns in the direction of a diameter of the stator cores, and adjoining coils pile on each other at the part in the direction of the diameter of the stator cores. The distribution changes in response to a predetermined range.

13 Claims, 14 Drawing Sheets

SLOTLESS MOTOR

BACKGROUND OF THE INVENTION

1. Field of the Invention

The invention relates to a slotless motor with coils which form revolving magnetic fields in stator cores having no slots.

2. DESCRIPTION OF THE BACKGROUND

A slotless motor can suppress electromagnetic noise and torque ripples of harmonic magnetic fluxes caused by stator slots. Because of that suppression ability, it is hoped to utilize the slotless motor for apparatuses in which low-noise and low-torque ripples are needed. The slotless motor is disclosed in Japanese Laid-open Patent Application (Kokai) No. 1-252134 and Japanese Publication Patent Application (Kokoku), No. 57-21932.

By the way, in the slotless motor, a gap between a stator and a rotor has a great influence on the characteristics of the slotless motor. Generally, as leakage fluxes increase in response to the size of the gap, output torque falls and a power factor changes for the worse according to the size of the gap.

Accordingly, it is desirable that the gap be as small as possible.

However, in the slotless motor as described above, it was difficult to make the gap sufficiently small, because the stator coils were constructed in two layers.

SUMMARY OF THE INVENTION

Therefore, an object of the invention is to provide a slotless motor which can have a sufficiently small gap between a stator and a rotor and improve characteristics of torque and power factor. In order to achieve the object, in the invention, the slotless motor having stator cores comprises a plurality of coils cylindrically disposed along the stator cores, each coil having a part which decreases a number of turns of the coil in the direction of a diameter of the stator cores, and adjoining coils piled on each other at the formed part in the direction of the diameter of the stator cores.

Accordingly, in the invention, each of the coils cylindrically disposed along the stator cores without slots is formed with a portion having a decreasing number of turns in the radial direction.

Further the adjoining coils are constructed to pile at the decreasing part in the direction of the diameter, and the stator coils are constructed in one layer.

According to that, the gap between the stator and the rotor can be smaller than the prior art. As a result, as it is possible to increase the thickness of the stator cores in response to the size of the gap, it is possible to improve the characteristics in response to the decrease of the leakages fluxes and to relax saturation conditions of the stator cores.

Further, when the thickness of the stator cores is not changed, it is possible to make the external size of the stator cores small in response to the decrease of the gap. Accordingly, it is possible to miniaturize the slotless motor.

DETAILED DESCRIPTION OF THE PREFERRED EMBODIMENTS

A first embodiment of the invention will be described with reference to FIG. 1 through FIG. 8.

Figure 1:
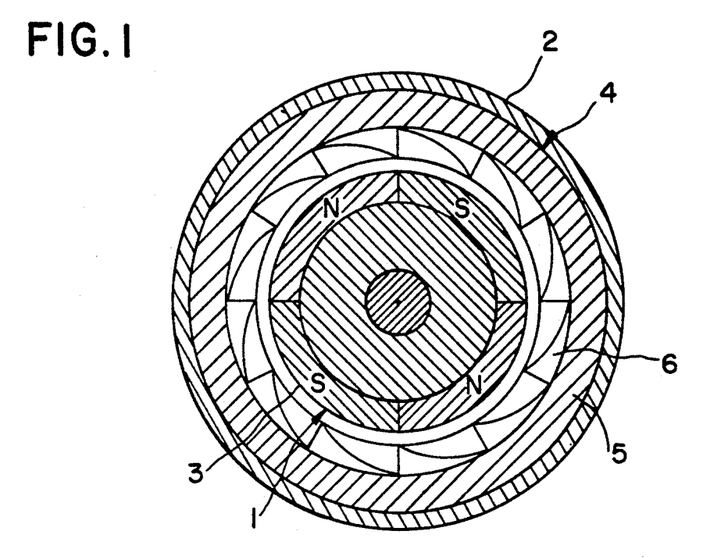
FIG. 1 is a schematic transverse sectional view of a slotless motor showing a first embodiment of the invention.

Referring to FIG. 1, a rotor 1 is disposed in a frame 2 through a bearing (not shown). The rotor 1 has a permanent magnet 3 to form four poles of magnetic poles. A stator 4 having three phases and four poles is disposed to enclose the rotor 1 in the frame 2. The stator 4 consists of stator core or cores 5 fixed in the frame 2 and coils 6 installed in the stator core 5, which form revolving magnetic fields.

In this case, the stator core 5 is formed cylindrically without slots by laminating electromagnetic steel sheets formed circularly. When the number of the phases of the stator 4 indicates m and the number of the poles of the stator 4 indicates p, the number of the coils is m×p (in this embodiment, as m=3 and p=4, the number of the coils is 12). Each of the four coils in the first phase (U phase) indicates U1 through U4, respectively, each of the four coils in the second phase (V phase) indicates V1 through V4, respectively and each of the four coils in the third phase (W phase) indicates W1 through W4.

Figure 2:
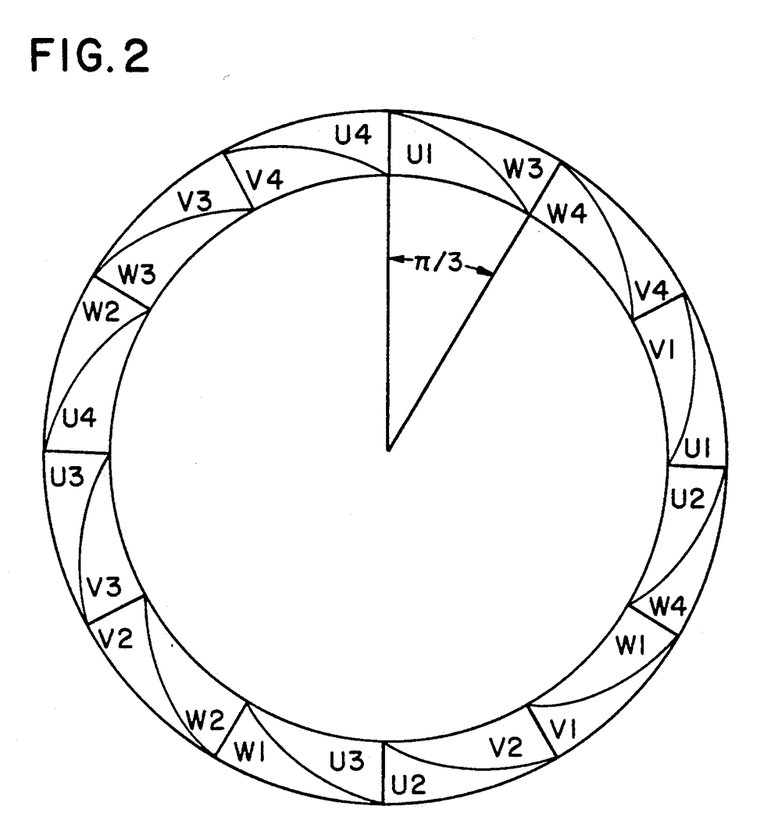
FIG. 2 is a view of the arrangement of coils showing the first embodiment of the invention.

FIG. 2 shows a transverse sectional view of coils 6 (U1~U4, V1~V4, W1~W4) installed in the stator core 5 and an example of the arrangement of them.

The coils U1~U4, V1~V4, W1~W4 are arranged in order in the direction of the circumference of a circle. The coils 6 are arranged in pairs (for example, U1 and U1 in FIG. 2), and each pair of the coils 6 occupies in ($2\pi/p$) degrees in the mechanical angles, i.e., 90 degrees in the mechanical angles. According to that, the coils 6 are arranged cylindrically along the inside of the stator core 5. Each of the coils 6 is constructed to satisfy the following conditions.

(Condition 1)

Each of the coils 6 is formed to decrease the number of turns in the direction of the diameter of the stator cores 5 toward the inside. In other words, as shown in FIG. 2, the thickness of, say, coil U1 in the radial direction decreases as U1 extends in a circumferential direction.

(Condition 2)

The decreasing parts of adjacent coils which are arranged cylindrically are piled on (or overlap) each other in the direction of the diameter of the stator core 5. (In this embodiment, the decreasing parts correspond to the whole coil 6.)

(Condition 3)

Each of the coils 6 is formed such that a distribution of the number of turns described in condition 1 changes, to be continuously, closely sine-wave shaped continuously in the range of ($\pi/m$) degree in the electrical angles, i.e. 60 degrees of the electrical angles.

When the distribution of the number of turns of each of the coils U1~U4, V1~V4, W1~W4 is formed to satisfy condition 3, the wave form about the distribution of electromotive force which is caused at the gap between the rotor 1 and the stator 4 by the coils U1~U4, V1~V4, W1~W4 is substantially a sine-wave shaped form.

Generally, when the wave form of the distribution of electromotive force is formed to be sine-wave shaped in a stator with slots, the number of the coils is limited. If the number of the slots indicates Z, the number of poles indicates p and the number of phases indicates m, each of the coils is winded to divide into Z/(p*m) coils. Accordingly, for example, when a motor has three phases, four poles and thirty six slots, each of the coils is winded to divide into 3 (=36/(3·4)=36/12) coils. When the number of conductors of every phase indicates n and the distribution of the number of conductors of every phase of the three coils described above is defined as $C_1$, $C_2$, and $C_3$, then $C_1$, $C_2$, and $C_3$ will be described as follows.

$$C_1 = [n/\{2\sin^2(\alpha q/2)\cdot \csc(\alpha/2)\}]\cdot \sin\{(q-\tfrac{1}{2})\alpha\} \qquad 1$$

$$C_2 = [n/\{2\sin^2(\alpha q/2)\cdot \csc(\alpha/2)\}]\cdot \sin\{(q-3/2)\alpha\} \qquad 2$$

$$C_3 = [n/\{2\sin^2(\alpha q/2)\cdot \csc(\alpha/2)\}]\cdot \sin\{(q-5/2)\alpha\} \qquad 3$$

$$\alpha = (2\pi/Z)\cdot(p/2) \text{ (radians)}$$

On the other hand, in the case of a stator without slots, the distribution of the number of conductors needs to be continued, and the outside of the coils divided into 12 (=p·m=4·3) parts occupies 30 (=360/12) degrees in the mechanical angles which corresponds to 60 degrees in the electrical angles. $\sin\{(q-\tfrac{1}{2})\alpha\}$ of the expression (1) will be calculated as follows.

$$\begin{aligned} q\alpha &= \{Z/(p\cdot m)\}\cdot (2\pi/Z)\cdot (p/2) \\ &= \pi/3 = 60 \text{ (degrees)} \end{aligned}$$

The distribution of the number of conductors of the inside of the coils will be calculated as follows.

$$\sin[\{q-(2q-1)/2\}\alpha] = \sin(\alpha/2)$$

$$\begin{aligned} \alpha/2 &= (1/2)\cdot(2\pi/Z)\cdot(p/2) \\ &= \pi p/(2Z) \end{aligned}$$

When it was supposed that the number of slots "Z" was infinite, the "$\pi p/(2Z)$" is equal to 0 (zero) degrees. Further, the distribution of the number of conductors of the middle part of the coils is formed to be sine-wave shaped based on a value that is $\{q-(2-1)/2\}$ multiplied by $\alpha$.

Accordingly, if the number of conductors is distributed in response to wave forms from sin 0° to sin 60°, namely the distribution of the number of turnings of the coils U1~U4, V1~V4, W1~W4 is formed to be the sine-wave shaped form in the range of 60 degrees in the electrical angles, the wave form about the distribution of electromotive force is formed to be a sine-wave shaped form.

The process to produce the stator 4 will be described as follows.

Figure 3:
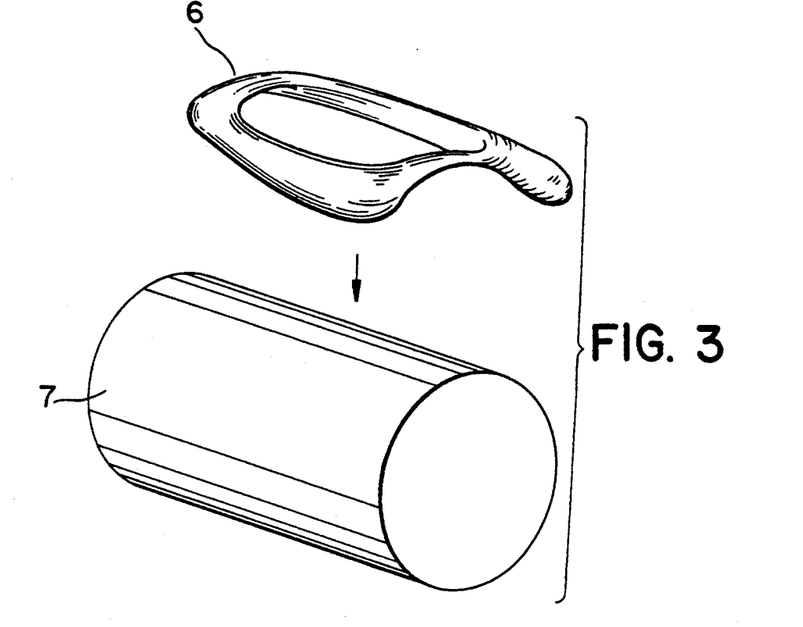
FIG. 3 is a perspective view of assembling a stator in the first step.
Figure 4:
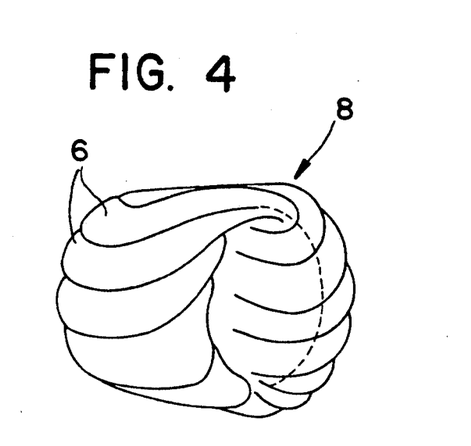
FIG. 4 is a perspective view of assembling the stator in the second step.

Referring to FIG. 3, a first coil 6 is put on an outside face of a cylindrical coil forming tool 7, a next one is shifted in the direction of the circumference of a circle, and is put on a part of the adjacent one. After putting on all of the coils 6, the cylindrical coil forming tool 7 is pulled out and a cylindrical coil 8 shown in FIG. 4 is produced.

When the coils 6 are put on, insulating paper (not shown) such as a polyester film or an aramid fiber sheet is inserted between each of coils 6. Thus, the insulating paper insulates between each of the coils 6. Further, the produced cylindrical coil 8 may be soaked in varnish.

Figure 5:
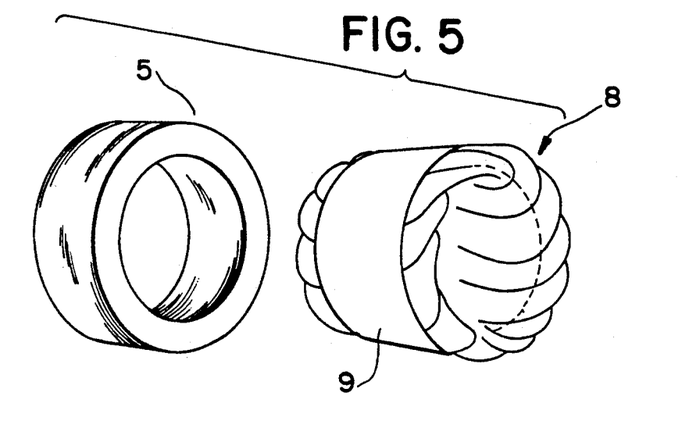
FIG. 5 is a perspective view of assembling the stator in the third step.

Referring to FIG. 5, the cylindrical coil 8 is surrounded with insulating paper 9 such as a polyester film or an aramid fiber sheet and the cylindrical coil 8 surrounded with the insulating paper 9 is inserted into the stator core 5.

Figure 6:
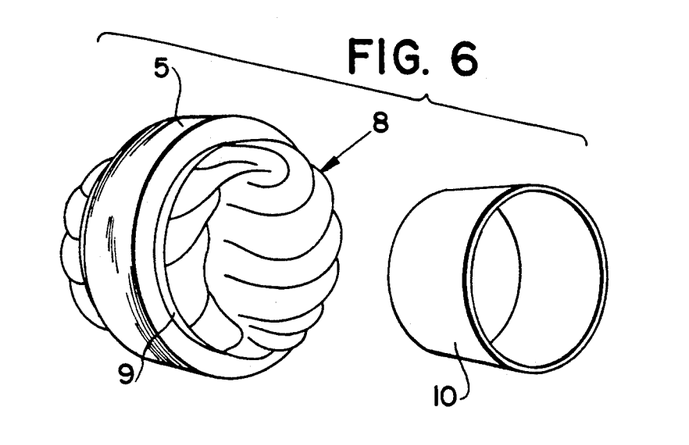
FIG. 6 is a perspective view of assembling the stator in the fourth step.
Figure 7:
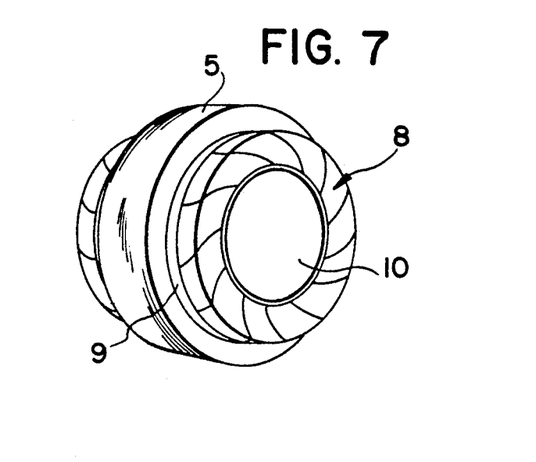
FIG. 7 is a perspective view of assembling the stator in the fifth step.

Referring to FIGS. 6, and 7, while inserting a cylindrical molding tool 10 into the cylindrical coil 8, the whole of the cylindrical coil 8 inserted in the cylindrical molding tool 10 is molded by a thermosetting resin and the stator core 5 and the cylindrical coil 8 are integrated. In this case, a thermosetting resin containing magnetic powder may be employed.

Figure 8:
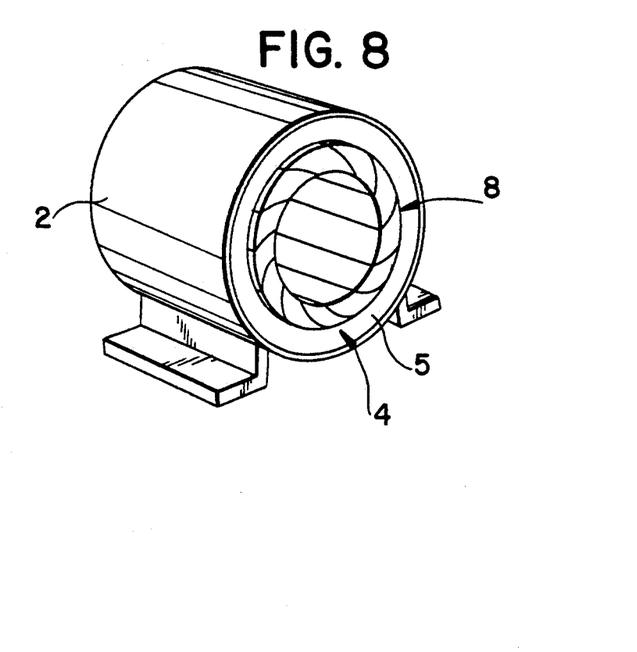
FIG. 8 is a perspective view of assembling the stator in the final step.

After the thermosetting resin has hardened, the cylindrical molding tool 10 is pulled out. After that, the integrated stator core 5 and cylindrical coil 8 are inserted into the frame 2, the stator core 5 is fixed to the frame 2 by bolting or caulking and so on and the stator 4 described in FIG. 8 is produced.

The integrated stator core 5 and cylindrical coil 8 are inserted into and fixed to the frame 2. The stator core 5 and the cylindrical coil 8 may be molded while inserting the integrated stator core 5 and cylindrical coil 8 into the frame 2, alternatively, the stator core 5 and the cylindrical coil 8 may be molded after the stator core 5 is inserted into and fixed to the frame 2, and the cylindrical coil 8 is inserted into the stator core 5. Further, when the stator core 5 and the cylindrical coil 8 are molded, a cover may be formed to the outside of the stator 4 by the thermosetting resin at the time. According to that, it is possible to produce a frameless motor which has no need of the frame 2.

As described above, in this embodiment, the twelve coils U1~U4, V1~V4, W1~W4 are arranged cylindrically to the inside face of the stator cores 5 and each pair of the coils 6 occupies a 90 degree arc in the mechanical angles.

The coils U1~U4, V1~V4, W1~W4 are formed to decrease the number of turns in the direction of the diameter of the status cores 5 toward the inside. A part which decreases the number of turnings of those parts on the adjacent coils which are arranged cylindrically is piled up on each other.

Accordingly, the coils U1~U4, V1~V4, W1~W4 are constructed in one layer, and the distribution of the number of turns is uniformalized at the part at which the adjacent coils pile on each other in the direction of the diameter of the stator core 5. As the thickness of the coils U1~U4, V1~V4, W1~W4 begins to increase, the gap between the rotor 2 and the stator 4 begins to be smaller than the prior art.

As a result, because it is possible to increase the thickness of the stator core 5 in response to the size of the gap, it is possible to improve the characteristics in response to the decrease of the leakage fluxes and to relax saturation conditions of the stator core 5. Further, when there is no need to increase the thickness of the stator core 5, it is possible to make the external size of the stator core 5 small in response to the decrease of the gap, and thus to miniaturize the slotless motor.

As the distribution of the number of turns of the coils U1~U4, V1~V4, W1~W4 changes continuously on the sine-wave shaped form in the range of 60 degrees in the electrical angles, the wave form about the distribution of electromotive force which is generated at the gap between the rotor 1 and stator 4 by the coils U1~U4, V1~V4, W1~W4 can be formed to be a substantially sine-wave shaped form. According to that, the slotless motor of this embodiment is prevented from generating harmonic magnetic fluxes. Thus, the occurrence of the magnetic noise and torque ripples due to relatively harmonic magnetic fluxes is effectively prevented.

Each of the coils U1~U4, V1~V4, W1~W4 is arranged cylindrically, one side of which is positioned at the inside and the other is positioned at the outside of cylindrical coil 8 as shown, e.g., in FIG. 2. Accordingly, the average distance between the sides of the coils U1~U4, V1~V4, W1~W4 and the rotor 1, i.e., the strength of revolving magnetic fields which operate the rotor 1, is uniformalized, and the torque ripples are reduced.

Because the coils U1~U4, V1~V4, W1~W4 and the stator core 5 are molded, when the electromagnetic force generates at the gap between the coils U1~U4, V1~V4, W1~W4 and the rotor 1, the deterioration of the characteristics of the motor due to the gap between the standard position of each of the coils U1~U4, V1~V4, W1~W4 and the actual position of them can be prevented.

When the coils U1~U4, V1~V4, W1~W4 and the stator core 5 are molded by the thermosetting resin contained in the magnetic powder, the gap between the rotor 1 and the stator 4 becomes small and the leakage of magnetic fluxes decreases. Accordingly, the characteristic of the output torque is improved. However, the magnetic powder may be contained by the thermosetting resin if necessary.

Although, in this embodiment, the distribution of the number of turnings of the coils U1~U4, V1~V4, W1~W4 decreases toward the inside of the coils, and the state of the decrease changes continuously on the sine-wave shaped form in the range of 60 degrees in the electrical angles, there is no need to form the sine-wave shaped form substantially as above.

Next, another example of the distribution of the number of turnings of the coils will be described in reference to FIGS. 9 through 15.

Figure 9:
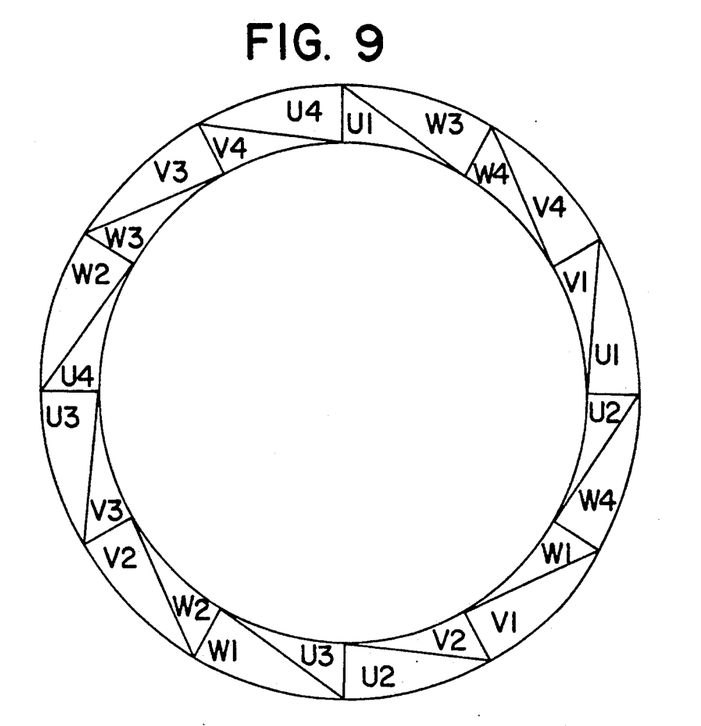
FIG. 9 is a view of a first example of the arrangement of coils.

In an example shown in FIG. 9, each boundary at the piling of the coils U1~U4, V1~V4, W1~W4 in the range of 60 degrees of the electrical angles is formed to change straight.

Figure 10:
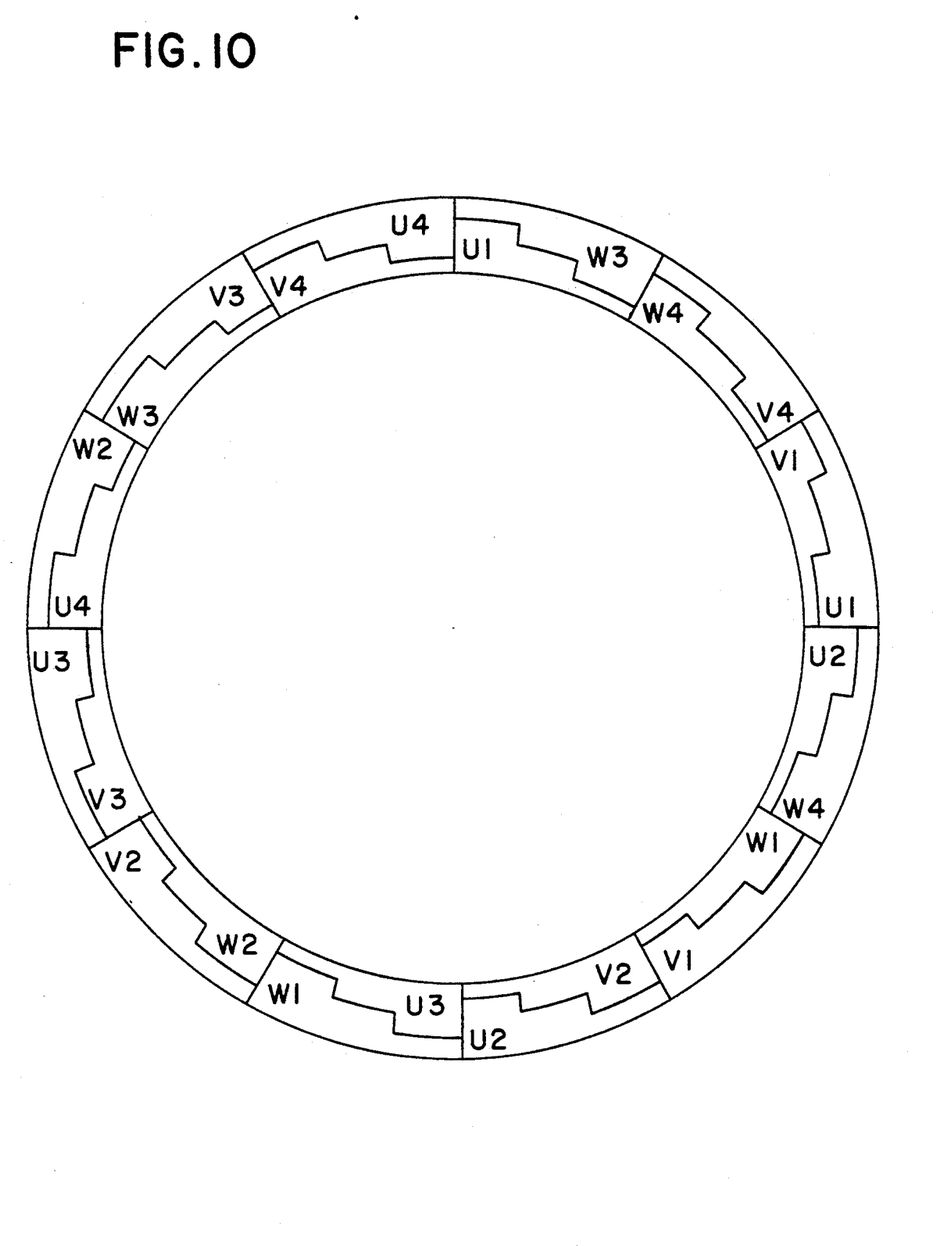
FIG. 10 is a view of a second example of the arrangement of coils.

In an example shown in FIG. 10, the boundary is formed to change like a three steps shaped form.

Figure 11:
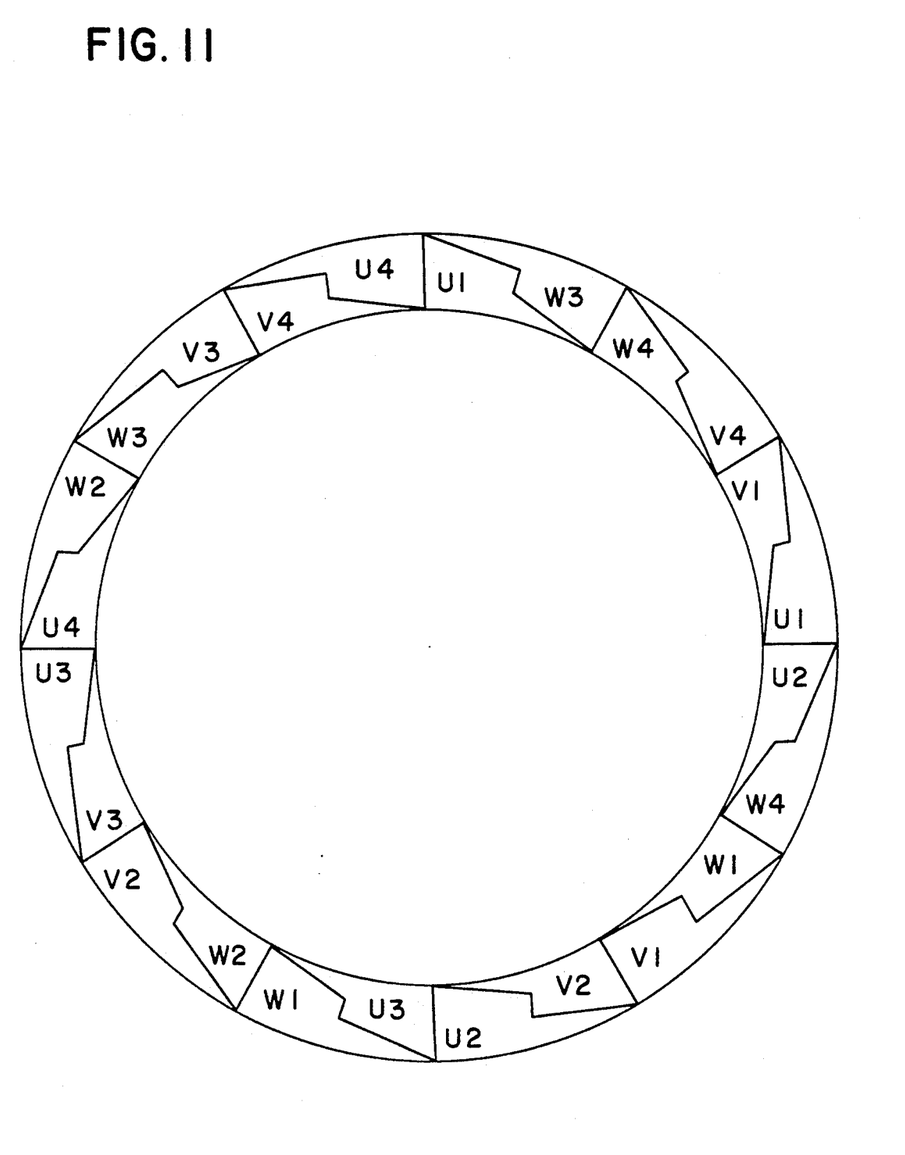
FIG. 11 is a view of a third example of the arrangement of coils.

In an example shown in FIG. 11, the boundary is formed to change straight to the middle part of the range of 60 degrees and is formed to change vertically at the middle part. Further it is formed to change straight in the remainder of the range of 60 degrees.

Figure 12:
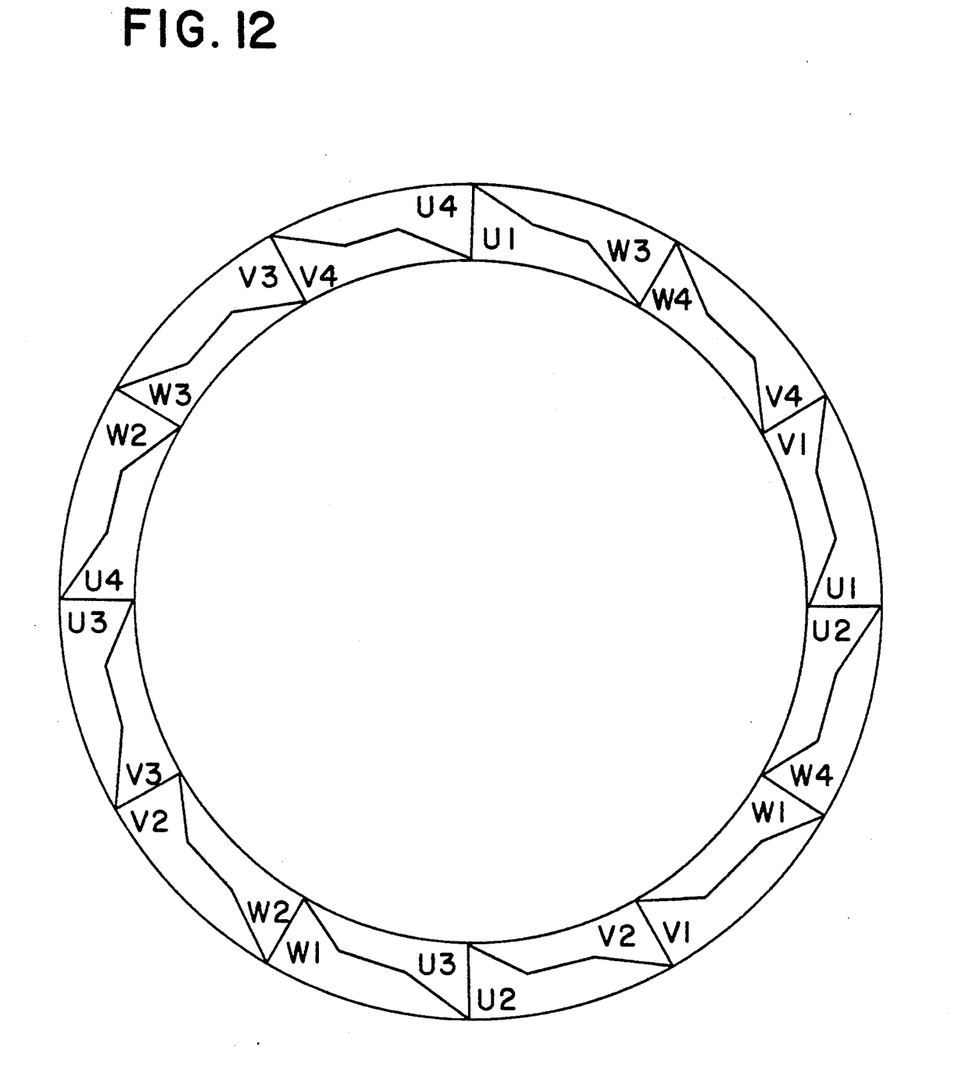
FIG. 12 is a view of a fourth example of the arrangement of coils.

In an example shown in FIG. 12, the boundary is formed to change straight in each of third parts on both sides in the range of 60 degrees.

Figure 13:
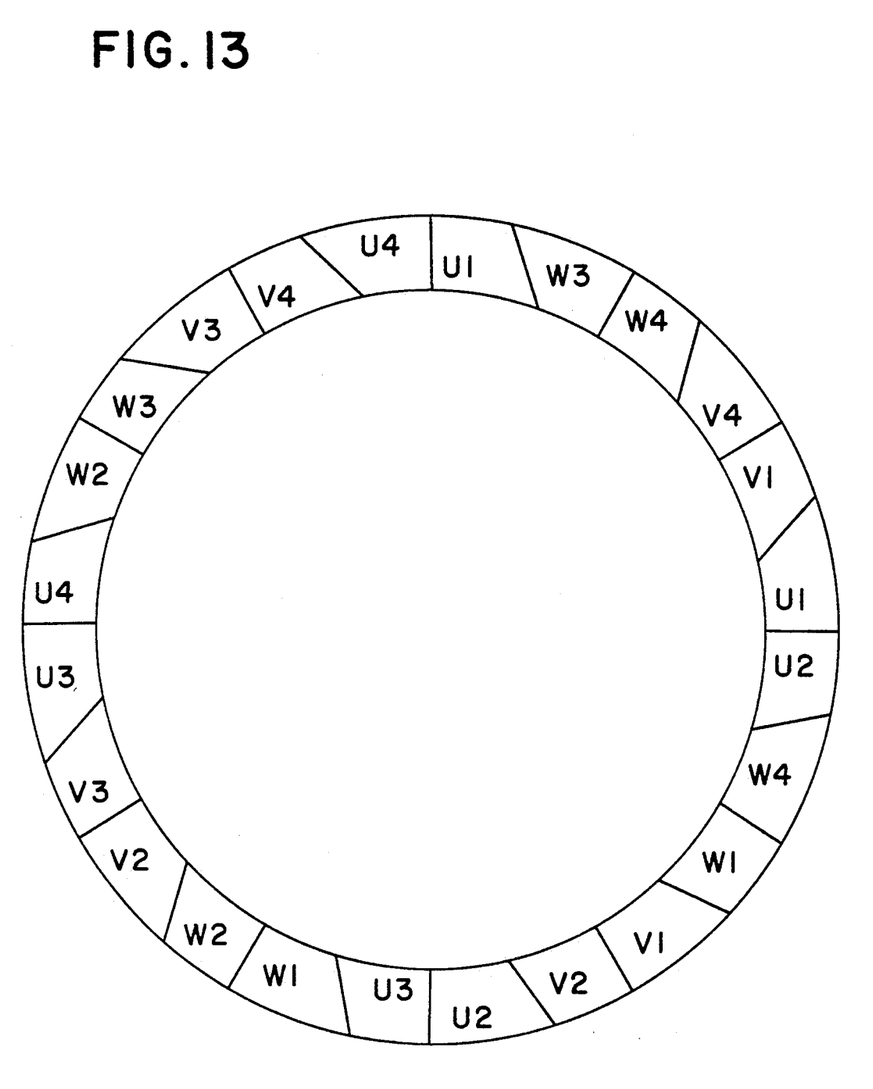
FIG. 13 is a view of a fifth example of the arrangement of coils.

In an example shown in FIG. 13, only one part near the inner circuit of the distribution of the number of turns is formed to change straight.

Figure 14:
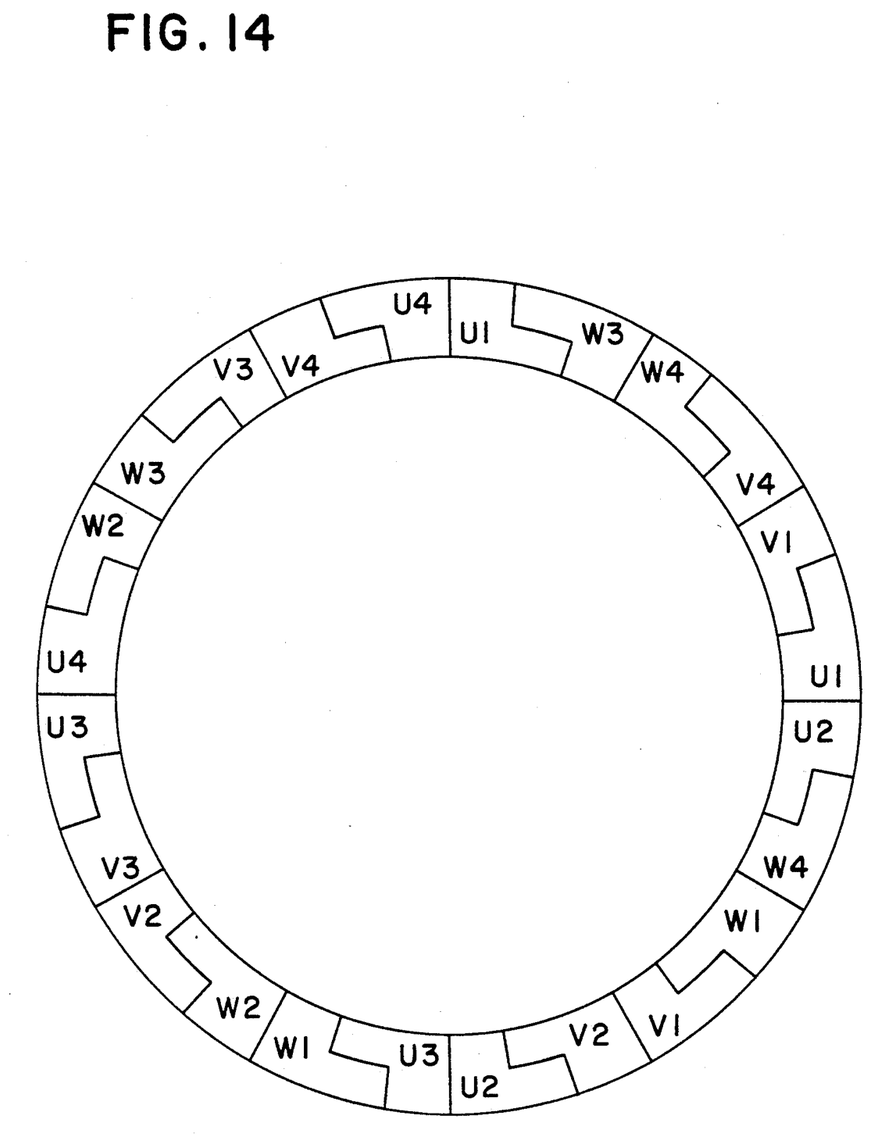
FIG. 14 is a view of a sixth example of the arrangement of coils.

In an example shown in FIG. 14, only a half part being near the inner circuit of the distribution is formed to decrease.

Figure 15:
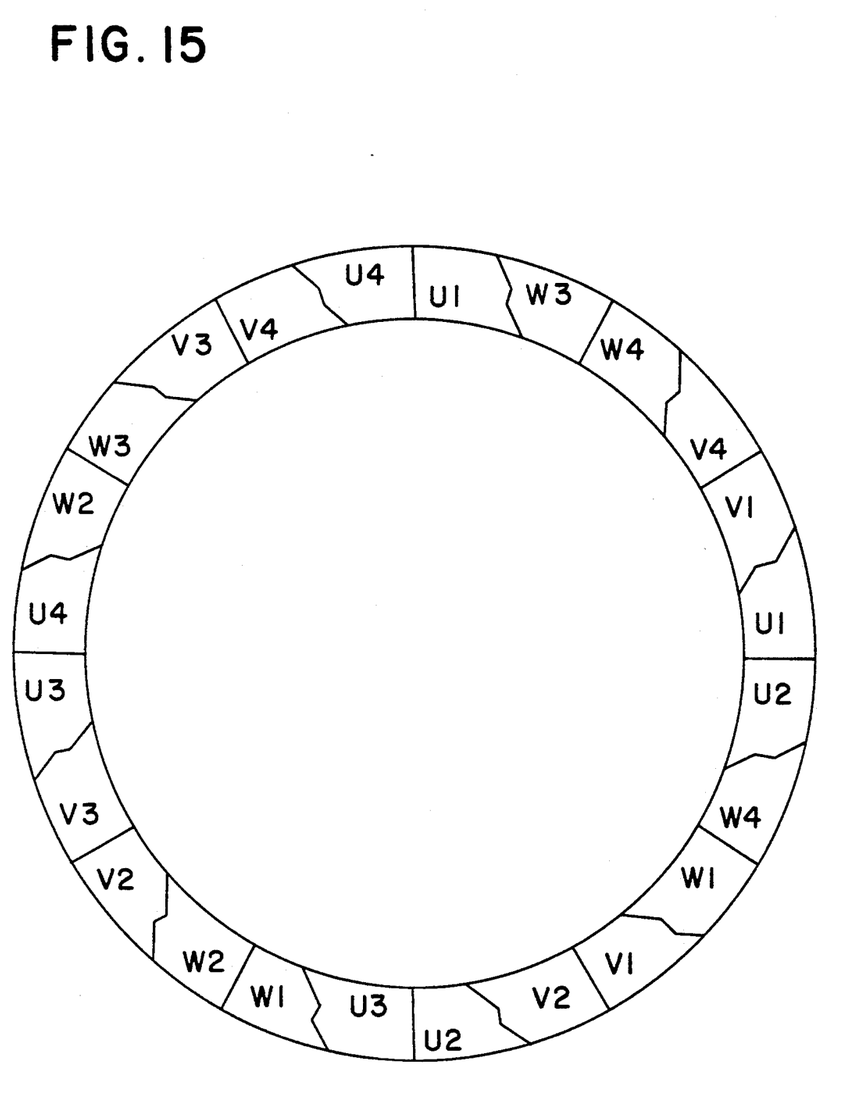
FIG. 15 is a view of a seventh example of the arrangement of coils.

In an example shown in FIG. 15, both sides of one part of the distribution is formed to change straight.

In the examples shown in FIGS. 9 through 15, as warps of the wave form of the distribution of the electromotive force due to each of the coils U1~U4, V1~V4, W1~W4 decrease and it is hard to generate the harmonic magnetic fluxes, the occurrence of the magnetic noise and torque ripples is prevented.

Although the stator core 5 is formed to pile up electromagnetic steel sheets which are manufactured in accordance with the conventional manner, the stator core 5 may be formed to pile up a low magnetostrictive material such as a 6.5% silicon steel sheet. Accordingly, it is possible to improve the electromagnetic characteristics of the motor.

Figure 16:
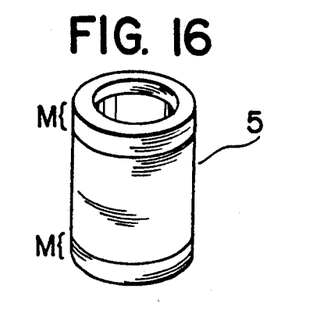
FIG. 16 is a perspective view of stator cores showing a second embodiment of the invention.

Next, a second embodiment of the invention will be described in reference with FIG. 16.

In this embodiment, a part M which is formed to pile up 6.5% silicon steel sheets is formed at portions of both edges in the direction of the axis of the stator core 5.

A third embodiment of the invention will be described in reference with FIG. 17.

In this embodiment, the stator core 5A is formed to coil a tape-shaped electromagnetic steel sheet longitudinally.

Further, a fourth embodiment of the invention will be described in reference with FIG. 18.

In this embodiment, the stator core 5B is formed to coil the tape-shaped electromagnetic steel sheet laterally as a wound core.

Figure 17:
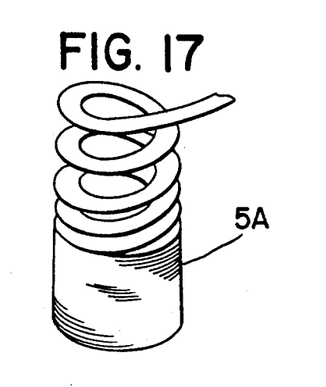
FIG. 17 is a perspective view of stator cores showing a third embodiment of the invention.
Figure 18:
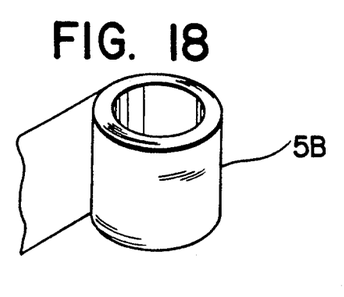
FIG. 18 is a perspective view of stator cores showing a fourth embodiment of the invention.

Accordingly, in the embodiments described in FIGS. 17 and 18, a yield of the stator core 5 is improved. Additionally, the shape of the stator core 5 isn't limited to a cylindrical form as above.

Figure 19:
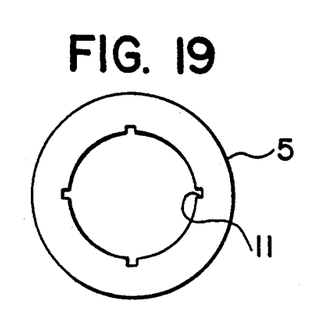
FIG. 19 is a top view of a first example of a form of stator cores.
Figure 20:
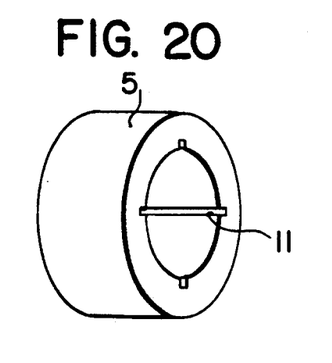
FIG. 20 is a perspective view of the first example of the form of stator cores.

As shown in FIGS. 19 and 20, the plurality of gaps or grooves 11 (there are four grooves in this example) may be formed at the inside of the stator core 5 in the direction of the axis of the stator core 5. In this case, when the stator core 5 and the cylindrical coil 8 are integrated, the thermosetting resin gets into the grooves 11. Accordingly, the cylindrical coil 8 is fixed by the grooves 11 certainly.

Figure 21:
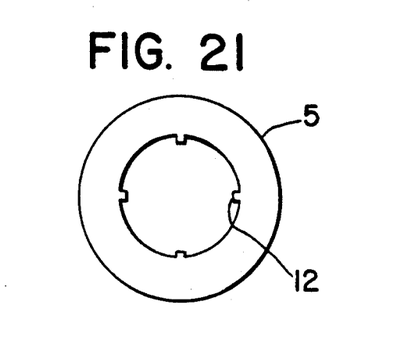
FIG. 21 is a top view of a second example of a form of stator cores.

Further, as shown in FIG. 21, a plurality of projections 12 (there are four projections in this example) may be formed at the inside of the stator core 5 in the direction of the axis of the stator core 5 instead of the grooves 11. When the stator core 5 and the cylindrical coil 8 are molded, the projections 12 are thrusted into the thermosetting resin. Accordingly, the cylindrical coil 8 is fixed by the projections 12 certainly.

Figure 22:
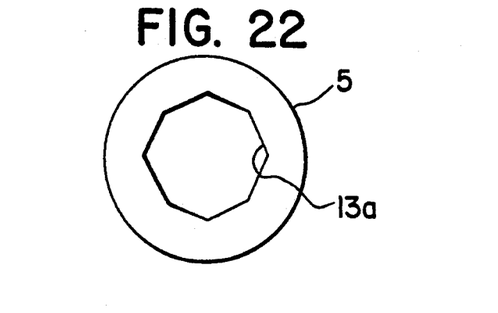
FIG. 22 is a top view of a third example of a form of stator cores.

As shown in FIG. 22, the inside of the stator core 5 is formed polygonally with a plurality of recesses 13a.

Figure 23:
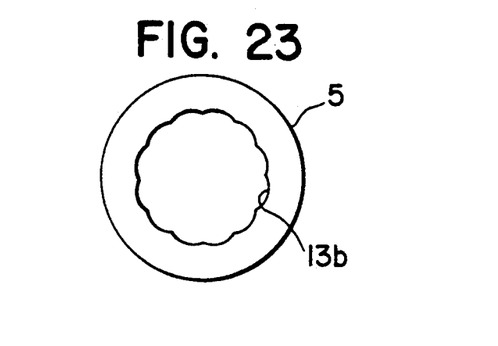
FIG. 23 is a top view of a fourth example of a form of stator cores.

As shown in FIG. 23, a plurality of arc-shaped recesses 13b is formed on the inside of the stator core 5.

According to the examples shown in FIGS. 22 and 23, the cylindrical coil 8 is fixed certainly. Particularly in the example shown in FIG. 23, if the number of the recesses 13b is set to equal the number of the coils 6, which is the number of phase "m" multiplied by the number of pole "p" (the number of the recesses is twelve in this example shown in FIG. 23), projections formed on the outside of the cylindrical coil 8 in response to the number of the coils 6 are positioned in the recesses 13b. Accordingly, the housing efficiency is improved.

Figure 24:
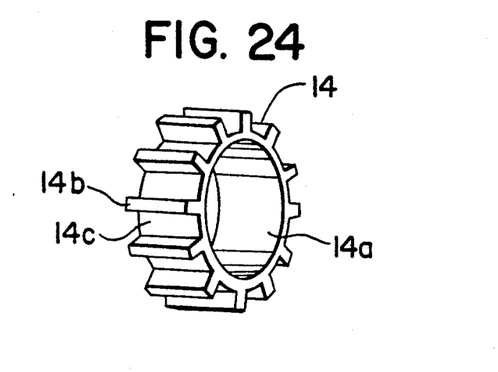
FIG. 24 is a perspective view of a bobbin showing a fifth embodiment of the invention.

A fifth embodiment of the invention will be described in reference with FIGS. 24, 25, and 26.

In the fifth embodiment, a bobbin 14 comprising twelve ribs 14b being formed to project on the outside of a ring 14a at regular intervals radially and hollows 14c being formed between each of the ribs 14b is housed into the stator core 5. The bobbin 14 is made from a non-magnetic material such as resin.

Figure 25:
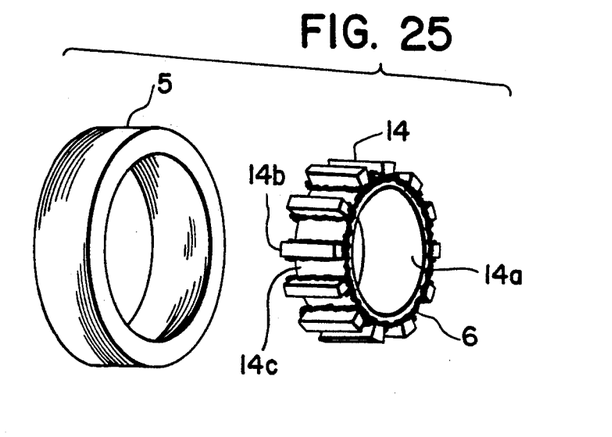
FIG. 25 is a perspective view of an assembling stator showing the fifth embodiment of the invention.

As shown in FIG. 25, the coils 6 are wound to the bobbin 14, the bobbin 14 with the coils 6 is inserted in the stator core 5, and it is fixed by bonding and so on.

Accordingly, in this embodiment, the whole time for manufacturing is reduced, because it has no need of the molding process. The motors are lightened and it is possible to manufacture them automatically.

Figure 26:
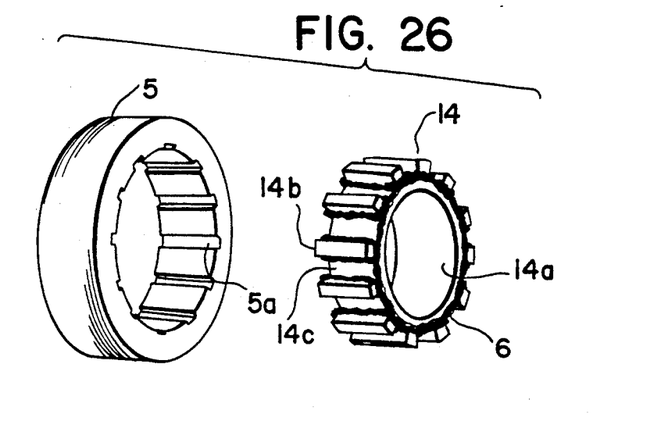
FIG. 26 is a perspective view of a modified example of the assembling stator showing the fifth embodiment of the invention.

As shown in FIG. 26, because recesses 5a inlaying the point portions of the ribs 14a of the bobbin 14 are formed on the inside of the stator core 5, the bobbin 14 is fixed certainly.

Although this invention has been applied to the slotless motor of an inner rotor type in which the rotor is rotated in the interior of the stator, this invention may be applied to those of an outer rotor type in which the rotor is rotated outside the stator.

The slotless motor of the outer rotor type will be described with reference to FIG. 27.

Figure 27:
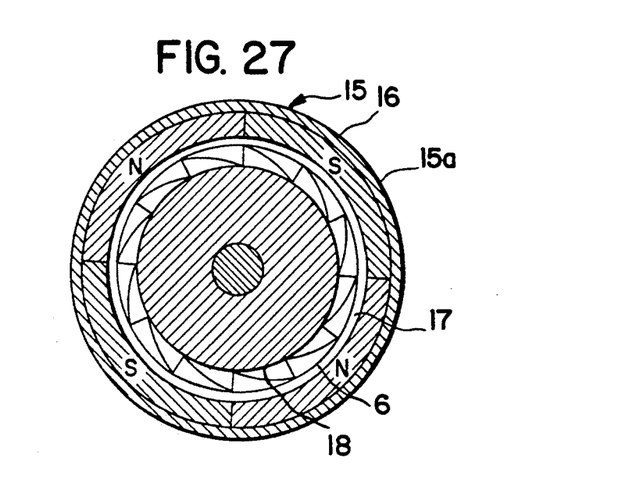
FIG. 27 is a schematic transverse sectional view of a slotless motor showing a sixth embodiment of the invention.

In FIG. 27, a rotor 15 supported by a bearing (not shown) includes a permanent magnet 16 which forms four poles of the magnetic poles inside a cup shaped yoke 15a. A stator 17 of three phases and four poles surrounded by the rotor 15 consists of ring shaped stator core or cores 18, and coils 6 forming the revolving magnetic fields which are mounted on the outside of the stator core 18.

As described above, according to this invention, as each of coils are constructed in one layer, the gap between the stator and the rotor can be reduced. Accordingly, the characteristics can be improved in response to a decrease of the leakage fluxes and the size of the slotless motor can be reduced.

What is claimed is:

1. A slotless motor having stator cores comprising:
   a plurality of coils cylindrically disposed along the stator cores, each coil having a formed part which decreases a number of turns of the coil in the direction of a diameter of the stator cores, and adjoining coils piled on each other at the formed part in the direction of the diameter of the stator cores;
   a stator having m phases and p poles;
   the plurality of coils being a product of multiplying m by p; and
   the coils being arranged in order in a circumferential direction of the stator cores in ($2\pi/p$) degrees in mechanical angles along the stator cores cylindrically.

2. A slotless motor having stator cores according to claim 1, wherein each of the coils is formed to decrease the number of turns in the direction of the diameter of the stator cores toward the inside of the coil.

3. A slotless motor having stator cores according to claim 1, wherein one side of each of the coils being formed cylindrically is located inside the cylindrical coil and the other side is located outside the cylindrical coil.

4. A slotless motor having stator cores according to claim 1 wherein, a distribution of a number of turns of each coil changes in response to a predetermined range.

5. A slotless motor having stator cores according to claim 1, wherein a distribution of a number of turns of each coil changes to be sine-wave shaped closely and continuous in response to a predetermined range.

6. A slotless motor having stator cores according to claim 1, wherein each of the coils is cylindrically arranged along the stator cores; wherein each of the coils is molded with the stator cores; and wherein the stator cores form a part which fixes the coils.

7. A slotless motor having stator cores according to claim 1, wherein each of the coils is molded by a resin containing magnetic powder.

8. A slotless motor having stator cores according to claim 1, which further comprises a bobbin winding each of the coils which bobbin is disposed into the stator cores.

9. A slotless motor comprising:
   a cylindrical stator core; and
   a plurality of coils of different phases cylindrically disposed along the stator core;
   a stator having m phases and p poles;
   the plurality of coils being a product of multiplying m by p; and the coils being arranged in order in a circumferential direction of the stator core in (2π/p) degrees in mechanical angles along the stator core cylindrically;

wherein a portion of each coil has a thickness of winding in a radial direction which decreases as the coil extends in the circumferential direction of the stator core; and wherein the coils of different phases overlay respectively.

10. The slotless motor of claim 9, wherein the overlapping coils are arranged in pairs.

11. The slotless motor of claim 9, wherein the overlapping coils has a substantially uniform thickness of winding throughout a circumferential distance of the pair.

12. The slotless motor of claim 10, wherein each coil of each pair of overlapping coils extends throughout the circumferential distance of the pair.

13. The slotless motor of claim 9, wherein the overlapping coils are arranged in pairs for improving magnetic flux distribution.

* * * * *